May 12, 1931.  C. G. MUNTERS  1,805,293
ABSORPTION REFRIGERATING APPARATUS
Filed March 27, 1929   4 Sheets-Sheet 1

INVENTOR
Carl Georg Munters
BY
his ATTORNEY

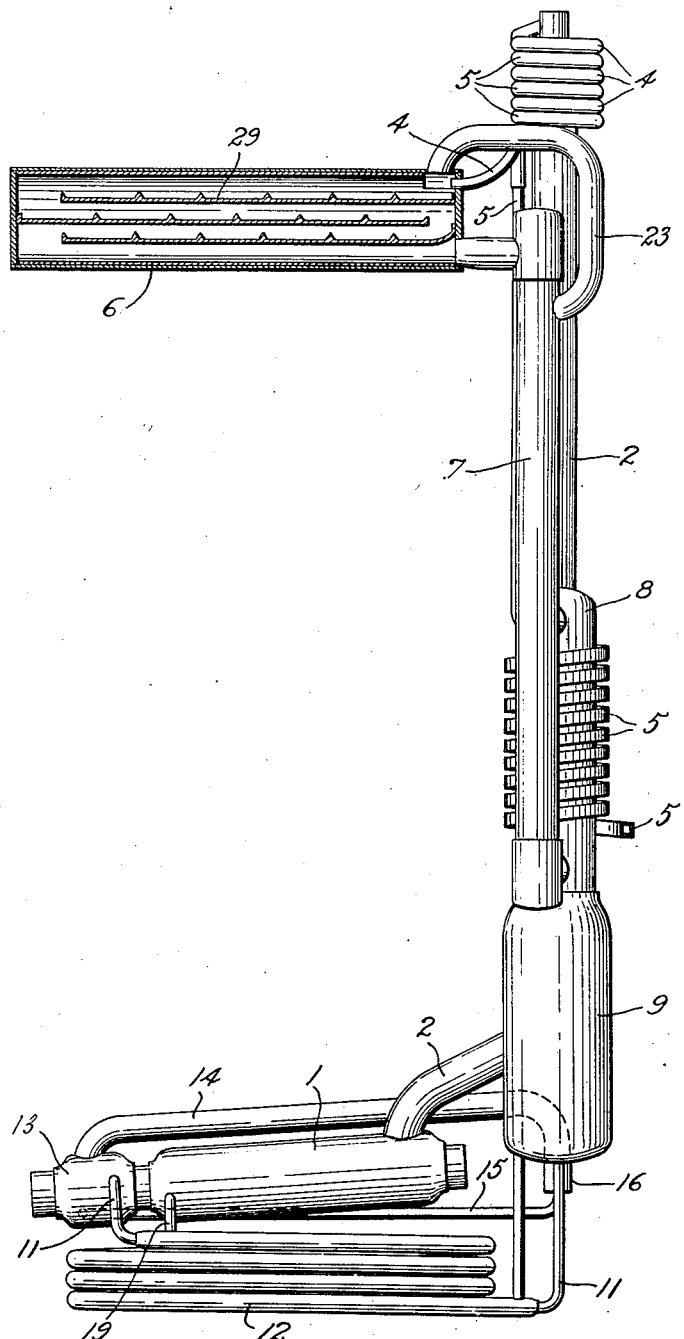

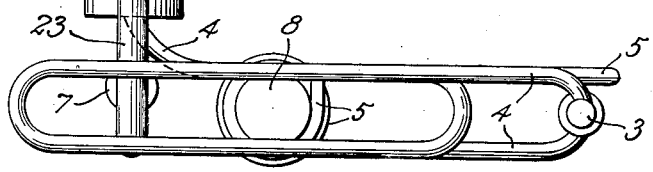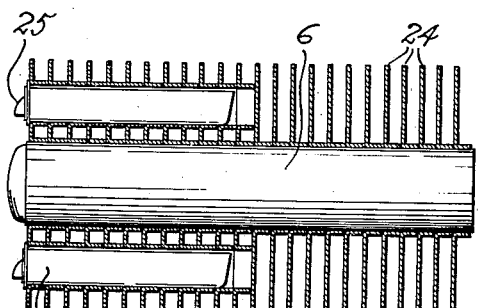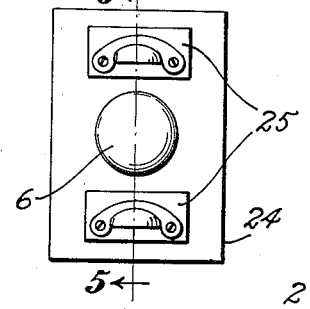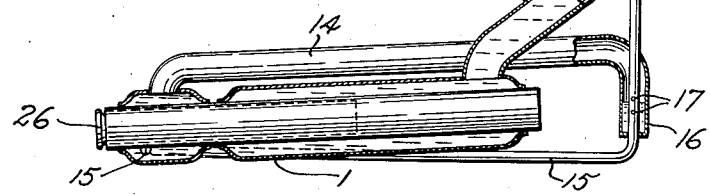

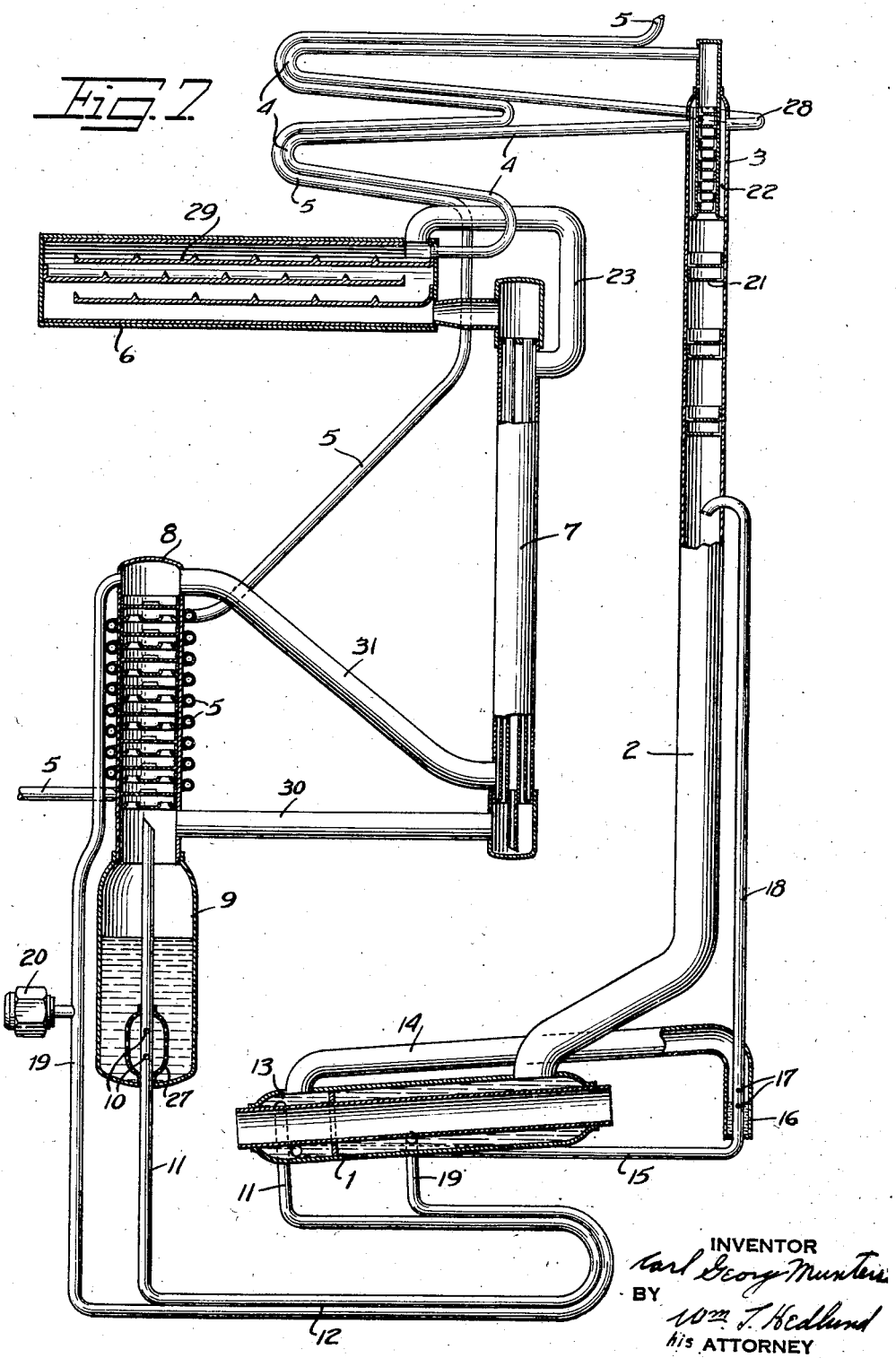

Patented May 12, 1931

1,805,293

UNITED STATES PATENT OFFICE

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE

ABSORPTION REFRIGERATING APPARATUS

Application filed March 27, 1929, Serial No. 350,150, and in Germany April 12, 1928.

My invention relates to liquid circulating devices for absorption refrigerating apparatus and more particularly for such apparatus which contains a pressure equalizing auxiliary medium.

One object of the invention is to provide a liquid circulating device which has a constant and uniform circulating action without undesired pressure transferences to other parts of the system.

A further object of the invention is to provide an arrangement which prevents the kinetic energy of the liquid moved having a deleterious effect on the liquid circulation through the system.

According to one feature of the present invention a circulating device adapted to lift strong solution from an absorber to a higher part of a generator comprises a heated circulating chamber to which are connected separate conduits for conveying gas and liquid out of the same and which are reunited at a point where intermixture of the gas and liquid causes movement of the latter through an upwardly extending thermo-siphon conduit. Preferably this conduit leads from the level of the circulating chamber to a higher part of the generator.

A further feature of the invention consists in the provision of a pipe supplying liquid from the absorber to the circulating chamber so arranged as to form a liquid column counterbalancing the liquid column forced by the pressure in the circulating chamber into the thermo-siphon conduit and at the same time preventing back-flow of gas from said chamber into the supply pipe and of liquid from the supply pipe into the absorber.

The supply pipe conveying strong liquid from the absorber to the circulating chamber is preferably arranged to project above the normal liquid level of the absorber but is at the same time in liquid connection with the absorber by the provision of liquid-flow resistance means located beneath said normal liquid level.

The liquid resistance means may comprise a baffle arrangement to baffle the free flow of liquid from the absorber into the supply pipe. The resistance may be produced by holes, slits or the like formed in the supply pipe, preferably surrounded by an outer apertured jacket.

My invention will be hereinafter more particularly described with reference to the accompanying drawings, in which:—

Fig. 2 is a side view corresponding to Fig. 1.

Fig. 3 is a side view, partially in cross section, of the circulating device of the invention.

Fig. 4 is a plan view corresponding to Fig. 1.

Fig. 5 is a section on the line V—V of Fig. 6.

Fig. 6 is a front view of the cooling body for the evaporator elements of the refrigerating apparatus.

Fig. 7 is a more or less diagrammatic view, partially in cross section, of the apparatus shown in Figs. 1 through 6.

Figure 1:
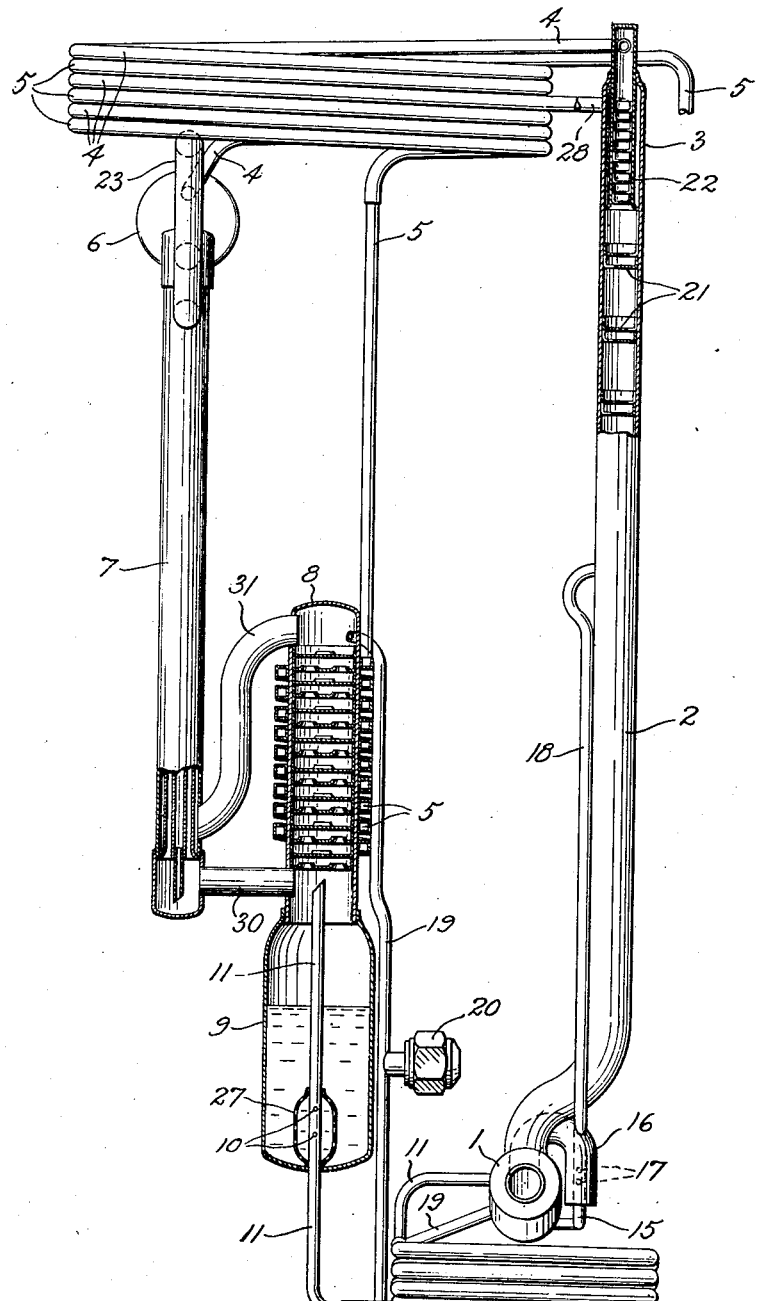
Fig. 1 is a rear view partly in section of an apparatus constructed in accordance with the invention.

The apparatus comprises the following parts. The main generator chamber 1 inclined slightly to the horizontal and adapted to be heated in any suitable manner such as, for example, by means of an inserted electric heating element 26 (Fig. 3), the generator riser pipe 2 which is part of the generator since the disengaging surface is well up in this pipe, a rectifier 3, a condenser 4, which is cooled by a cooling water pipe 5, an evaporator 6, on which are secured aluminium plates 24 preferably flanged at their inner edges and at the same time formed to enclose ice drawers 25, a gas heat exchanger 7, an absorber 8 which is preferably cooled by the same cooling water pipe 5 as the condenser, a liquid storing chamber 9 in open connection with the absorber 8, a pipe 11 projecting into this chamber, preferably surrounded by a perforated member 27 and provided with holes 10, which conveys the strong liquid through the exchanger 12 to a separate circulating chamber 13 also constituting a part of the generator as a whole, preferably heated by the same heating source 26 as the main generator chamber, a gas pipe 14 leading from the circulating chamber, a liquid pipe 15 which at 16 is again in communication with the gas pipe 14, a thermo-siphon conduit 18 rising from the chamber 16 and preferably provided with a plurality of holes 17, which pipe 18 opens into the generator riser pipe 2 and a pipe 19 extending from the main generator chamber 1 and leading weak solution to the absorber, which extends through the heat exchanger 12 to the upper part of the absorber 8 and to which is connected the filling plug member 20.

For the purpose of explaining the manner of operation of the apparatus, it will be assumed that it operates with water as a solvent, ammonia as a refrigerating agent and hydrogen as a pressure equalizing auxiliary gas.

The gas driven out of solution on heating the main generator chamber 1 rises owing to the inclined position of the main generator chamber into the generator riser pipe 2. Here it strikes against the groups of baffle plates 21 and the water carried therewith is separated in known manner. The gas then flows into the rectifier 3 where the remaining water vapor still carried along with the ammonia vapor is condensed. From the rectifier, the practically pure ammonia vapor flows into the condenser 4 where it is liquefied. The condensate fills the jacket space 22 of the rectifier which space is connected with the condenser by the pipe 28. Preferably the condensate enters one side of the jacket space 22 at the top and passes out on the other side, also at the top, as indicated in Fig. 1. From there condensate and the vapor again evolved in the jacket space of the rectifier pass through a further part of the condenser and then flow, as liquid, into the upper part of the evaporator on to evaporator plates of known type 29. Here the liquid refrigerating agent evaporates in known manner into the hydrogen flowing thereto through the pipe 23. The gas mixture descends through the heat exchanger 7 to the absorber 8 into the lower part of which it enters through the pipe 30. Here the ammonia is absorbed by the weak solution flowing, on account of the higher level in the generator riser pipe 2, from the main generator chamber 1, through the pipe 19 and the heat exchanger 12 into the absorber 8, while the non-absorbed hydrogen flows back through the pipe 31 and the heat exchanger 7 to the evaporator.

The solution enriched in the absorber 8 collects in the collecting chamber 9 which is in free communication with the absorber. From chamber 9 the strong solution flows through the holes 10 into the pipe 11 and through heat exchanger 12 to the circulating chamber 13.

The circulating chamber 13 is preferably heated by the same source of heat as the main generator chamber 1. Gas is driven out of the strong solution therein, and passes through the larger gas pipe 14, while the liquid flows through the smaller liquid pipe 15 to the chamber 16, where the gas, in known manner, on its entry through the holes 17 of the thermo-siphon conduit 18, lifts the liquid in the conduit 18 into the generator riser pipe 2. In order to obtain the best operation of the thermo-siphon, I believe that the liquid should not be lifted directly by means of a thermo-siphon conduit out of the heated, and therefore gas separating, chamber. The separation of gas causes a turbulent upper surface of the liquid which would result in an uncertain and transitory shutting off of the thermo-siphon conduit by liquid sections, which in its turn, would promote pressure variations in the system. According to the invention, therefore, gas and liquid are separated in the turbulently boiling circulating chamber, led away by different pipe systems and are then reunited in a chamber with a non-turbulent surface.

A liquid section, formed for example by injection of gas into the thermo-siphon conduit 18, produces a liquid column head which must be balanced and for the lifting of which into the generator riser pipe 2 work is necessary, which can only be produced by pressure increase in the circulating chamber 13. This pressure increase, however, in its turn necessitates also a pressure in the supply pipe 11 coming from the absorber which pressure under certain circumstances may cause a return flow or oscillation of liquid from the circulating chamber to the absorber. It is therefore of importance to cause the supply pipe 11 leading from the absorber to the circulating chamber 13 to open into the circulating chamber 13 beneath the level of liquid determined by the height of the holes 17 formed in the thermo-siphon conduit so that even with very slight oscillation the possible resultant gas pressure does not force back the liquid columns into the pipe 11 and then force gas into the pipe 11 which gas with subsequent normal pressure would first have to be expelled before liquid flow could again take place. In accordance with the invention, therefore, this opening of the supply pipe is located beneath the liquid level in the circulating chamber but, however, near this liquid level, since, with larger unintentional pressure variations set up in the system, if the supply pipe were located at the lowest point of the circulating chamber, it might happen that the circulating chamber would be forced quite empty by the pressure set up and the empty circulating chamber be heated too much.

In order to quickly produce the necessary counterbalance on sealing of the thermo-siphon conduit 18 by small liquid sections, the supply pipe 11 to the pumping chamber is, in accordance with the invention, carried high in the absorber. This offers the advantage that the pressure set up in the pumping chamber on the sealing abovementioned causes only a small amount of liquid corresponding to the diameter of this pipe to be forced upwardly. If the corresponding liquid column was produced in the absorber 8 or the collecting vessel 9 itself, amounts of liquid corresponding to the cross sections thereof would have to be forced back. If, however, in accordance with the invention, the pipe 11 is continued upwardly through the vessel 9, only the liquid rising in the pipe 11, on pressure variations in the circulating chamber, flows back and augments the liquid gradually flowing through the holes 10.

The abovementioned back flow of the liquid resulting from pressure variations in the circulating chamber, which may occur on account of the entry of liquid sections into the thermo-siphon conduit or may occur for any other reason, has the further disadvantage that on reduction of the pressure, for example when the sections are finally forced out of the thermo-siphon pipe into the generator, the absorption solution suddenly flows forward and, being liquid, it naturally takes up kinetic energy. This kinetic energy then acts in such a way that the flow does not cease when the normal level in the circulating chamber is produced, but the level rises above the normal due to the oscillation. However, the result at the most is that a new section is formed in the thermo-siphon conduit 18 which results in a renewal of rise of pressure and the liquid is again forced back. This disadvantage is removed by the invention in that the pipe leading from the liquid storage space to the circulating chamber is provided with such a great resistance to flow that gradual equalization of the liquid levels takes place and the taking up of the kinetic energy by the liquid contained in the pipe is prevented. This resistance can, for example, be formed by compelling the liquid to flow through one or more narrow holes, slits or the like. The resistance set up affords the possibility of producing a pressure equalizing liquid column in the upper part of the pipe 11.

The liquid systems comprising on the one hand the riser pipe 2, main generator chamber 1, pipe 19, and on the other hand, chamber 9, pipe 11, circulating chamber 13, pipes 14, 15 and 18 are separate from one another. If the apparatus for example is non-operative so that the thermo-siphon does not work and the liquid level in the pipe 2 falls to the height of the point of entry of the pipe 19 into the absorber, connection between the liquids is no longer possible and no alteration of concentration by intermixture will occur. If, therefore, a certain and uniform circulating action is to be obtained, it is important on charging the apparatus to supply the apparatus with more pure absorption liquid than corresponds to the volume of the generator and the pipes connected therewith, since otherwise, under certain circumstances, it might happen that the refrigerating agent is completely evaporated from the generator, that all liquid is pumped over out of the absorber, that also the refrigerating agent has escaped therefrom and the amount of pure absorption liquid now remaining is not sufficient to give the requisite level in the pipe to render certain the further entry of liquid into the absorber system. In order, during normal operation, to take up the further volume present of the liquefied refrigerating agent, the collecting vessel 9 is provided. Also on account of the separation of the generator and the absorber systems, it is important, in the filling of the apparatus to make sure that there is a sufficient amount of liquid in the heated generator system. According to the invention, therefore, the filling plug 20 is arranged in the pipe system of the generator and preferably so that it always lies under the liquid level existing in the apparatus both under operating and non-operating conditions.

Having thus described my invention, what I claim is:

1. That improvement in the art of refrigeration through the agency of an absorption system including an absorber, a circulating chamber and a generator which comprises flowing strong absorption liquid from the absorber to the circulating chamber, heating the liquid to vaporize a portion of the refrigerant from solution therein, conveying the resulting vapor and remaining liquid through separate conduits to a cooler point outside said chamber, raising the liquid by the vapor due to thermo-siphon action to a level above the absorber, heating the liquid to vaporize further refrigerant and flowing the remaining liquid to the absorber.

2. That improvement in the art of refrigeration through the agency of an absorption system including an absorber, a circulating chamber and a generator which comprises flowing strong absorption liquid from the absorber to the circulating chamber, heating the liquid to vaporize a portion of the refrigerant from solution therein, providing a column of liquid of comparatively small cross section to balance the pressure resulting from the generation of vapor, conveying the resulting vapor and remaining liquid through separate conduits to a cooler point outside said chamber, raising the liquid by the vapor due to thermo-siphon action to a level above the absorber, heating the liquid to vaporize further refrigerant and flowing the remaining liquid by gravity to the absorber.

3. Refrigerating apparatus comprising a generator, an absorber, a circulating chamber, means for conveying liquid from said absorber to said chamber, means for heating said chamber, a conduit for conveying vapor from said chamber, a conduit for conveying liquid from said chamber, said conduits joining at a point outside said chamber, a thermo-siphon conduit extending from said point to a point of said generator above said absorber, means for heating said generator and means for conveying liquid from said generator to said absorber.

4. In an absorption refrigerating apparatus, an absorber, a generator, a circulating chamber, a conduit for conveying liquid from said absorber to said circulating chamber, said conduit extending above the normal liquid level in said absorber and provided with one or more apertures below the liquid level, means for heating said chamber, a conduit for conveying vapor from said chamber, a conduit for conveying liquid from said chamber, said two last mentioned conduits joining at a point outside said chamber, a thermo-siphon conduit extending from said point to a point of said generator above said absorber, means for heating said generator and means for conveying liquid from said generator to said absorber.

5. In an absorption refrigerating apparatus, an absorber, a generator, a circulating chamber, a conduit for conveying liquid from said absorber to said circulating chamber, means for heating said chamber to produce vapor, means for lifting the liquid by the vapor to a point in the generator above the absorber, means for creating a column of liquid in said conduit above the level of the liquid in the absorber in order to balance the pressure resulting from vapor generation in said chamber, means for heating said generator and means for conveying liquid from said generator to said absorber.

6. Refrigerating apparatus comprising a generator, an absorber, a circulating chamber, a conduit for conveying liquid from said absorber to said chamber, means for heating said chamber, a conduit for conveying vapor from said chamber, a conduit for conveying liquid from said chamber, said two last mentioned conduits joining at a point outside said chamber, a thermo-siphon conduit extending from said point to a point of said generator above said absorber and being provided with one or more apertures near its lower end, said conduit for conveying liquid from said absorber to said chamber communicating with said chamber below the level of the lowermost hole in said thermo-siphon conduit, means for heating said generator and means for conveying liquid from said generator to said absorber.

7. In an absorption refrigerating apparatus, an absorber, a generator, a circulating chamber, a conduit for conveying liquid from said absorber to said circulating chamber, said conduit extending above the normal liquid level in said absorber and provided with one or more apertures below the liquid level, a perforated member surrounding said conduit in the neighborhood of said apertures, means for heating said chamber, a conduit for conveying vapor from said chamber, a conduit for conveying liquid from said chamber, said two last mentioned conduits joining at a point outside said chamber, a thermo-siphon conduit extending from said point to a point of said generator above said absorber, means for heating said generator and means for conveying liquid from said generator to said absorber.

8. In an absorption refrigerating apparatus, an absorber, a generator, a circulating chamber, a conduit for conveying liquid from said absorber to said circulating chamber, said conduit extending above the normal liquid level in said absorber and provided with one or more apertures below the liquid level, a perforated member surrounding said conduit in the neighborhood of said apertures, means for heating said chamber to produce vapor, means for lifting the liquid by the vapor from said chamber to a point in the generator above said absorber, means for heating said generator and means for conveying liquid from said generator to said absorber.

In testimony whereof I hereunto affix my signature.

CARL GEORG MUNTERS.